United States Patent
Li et al.

(10) Patent No.: US 7,991,878 B2
(45) Date of Patent: Aug. 2, 2011

(54) METHOD, SYSTEM AND TERMINAL FOR MAINTAINING CAPABILITY MANAGEMENT OBJECT AND FOR MANAGING CAPABILITY

(75) Inventors: Kepeng Li, Guangdong (CN); Xiaoqian Chai, Guangdong (CN); Jiangshui He, Guangdong (CN)

(73) Assignee: Huawei Technologies Co., Ltd. (CN)

( * ) Notice: Subject to any disclaimer, the term of this patent is extended or adjusted under 35 U.S.C. 154(b) by 181 days.

(21) Appl. No.: 12/007,777

(22) Filed: Jan. 15, 2008

(65) Prior Publication Data

US 2008/0114570 A1 May 15, 2008

Related U.S. Application Data

(63) Continuation of application No. PCT/CN2007/000681, filed on Mar. 2, 2007.

(30) Foreign Application Priority Data

Jul. 26, 2006  (CN) .......................... 2006 1 0103914

(51) Int. Cl.
*G06F 15/16* (2006.01)
*H04M 3/00* (2006.01)
(52) U.S. Cl. ......... 709/224; 709/220; 709/228; 455/419
(58) Field of Classification Search .................. 709/224, 709/227, 228, 226; 711/163; 455/419
See application file for complete search history.

(56) References Cited

U.S. PATENT DOCUMENTS

| 6,754,699 | B2 * | 6/2004 | Swildens et al. ............... 709/217 |
| 7,233,790 | B2 * | 6/2007 | Kjellberg et al. ............. 455/419 |
| 2004/0054786 | A1 * | 3/2004 | Kjellberg et al. ............. 709/228 |
| 2005/0055397 | A1 | 3/2005 | Zhu et al. |
| 2007/0130331 | A1 * | 6/2007 | Kao et al. ...................... 709/224 |
| 2008/0220759 | A1 * | 9/2008 | Norrman ....................... 455/419 |
| 2009/0049166 | A1 * | 2/2009 | Roman et al. .................. 709/223 |
| 2009/0049518 | A1 * | 2/2009 | Roman et al. ..................... 726/1 |

FOREIGN PATENT DOCUMENTS

| CN | 1598851 A | 3/2005 |
| CN | 1794657 A | 6/2006 |
| EP | 1515571 | 3/2005 |

OTHER PUBLICATIONS

Open Mobile Alliance; "Device Management Requirements"; Candidate Version 1.2, pp. 1-63, (Apr. 24, 2006).

(Continued)

*Primary Examiner* — Khanh Q Dinh
(74) *Attorney, Agent, or Firm* — Finnegan, Henderson, Farabow, Garrett & Dunner, LLP

(57) ABSTRACT

A method for maintaining a Device Capability Management Object (DCMO) which relates to technical field of Open Mobile Alliance Device Management (OMA DM), including detecting changed capability information in a terminal device by the terminal device, and maintaining a corresponding Device Capability Management Object in a Device Management tree in the terminal device based on the detected changed capability information, is used to overcome that wireless transmission resources are wasted and processing payloads of a Device Management Server (DMS) system are increased when updating and maintaining the corresponding Device Capability Management Object once capability information in the terminal device changes.

24 Claims, 9 Drawing Sheets

OTHER PUBLICATIONS

Open Mobile Alliance; "OMA Device Management Protocol"; Candidate Version 1.2, pp. 1-51, (Apr. 24, 2006).

English Translation of Written Opinion of the International Searching Authority for International Application No. PCT/CN2007/000681, mailed May 31, 2007.

Open Mobile Alliance, "Device Capability MO," 3 pages, Mar. 31, 2006.

Open Mobile Alliance, "Device Capability Management object," 2 pages, Jun. 6, 2006.

Open Mobile Alliance, "DM Smart Card Requirements," 21 pages, Jun. 22, 2006.

Notice of Office Action for Application No. 10-2008-7003069, Korean Intellectual Property Office, mailed Sep. 30, 2009.

* cited by examiner

METHOD, SYSTEM AND TERMINAL FOR MAINTAINING CAPABILITY MANAGEMENT OBJECT AND FOR MANAGING CAPABILITY

CROSS-REFERENCE TO RELATED APPLICATIONS

This application is a continuation of International Application NO. PCT/CN2007/000681, filed Mar. 2, 2007, which claims the priority of Chinese Application No. 200610103914.6, filed Jul. 26, 2006, the content of both of which is incorporated herein by reference.

FIELD OF THE INVENTION

The present invention relates to technical field of Open Mobile Alliance Device Management (OMA DM), particularly to a method and terminal device for maintaining a Device Capability Management Object (DCMO), and a method and system for managing device capability.

BACKGROUND OF THE INVENTION

The specification of OMA DM relates to a technique for managing, diagnosing and maintaining a mobile terminal device, which enables a Device Management Server (DMS) to manage the terminal device remotely in a manner of Over The Air (OTA). The management operations implemented by the DMS to the terminal device include parameter configuration for the terminal device, firmware update, software installation and upgrading, fault diagnosis, etc. The management operations implemented by the DMS to the terminal device further include management for the ring tone, desktop and tasks of the terminal device.

FIG. 1 is a model view of an overall management architecture according to the DM specification in the prior art. As shown in FIG. 1, in the model view of the overall management architecture, a Device Management Agent (DM Agent) in the terminal device is used for interpreting and implementing various management commands sent by a DMS. A DM tree stored in the terminal device may be regarded as an interface for managing the terminal device via DM protocol by the DMS. The DM tree includes a set of basic Management Objects (MOs). The DMS controls terminal device resources by means of management operations for each MO in the DM tree. The management commands for operating the MOs in the DM tree by the DMS include getting command (Get), replacing command (Replace), executing command (Exec), copying command (Copy), deleting command (Delete), etc.

FIG. 2 is a structural status diagram illustrating respective MOs of a DM tree in a terminal device of the prior art. As shown in FIG. 2, according to the operating principle of the OMA DM protocol, a DMS may manage a software component in the terminal device through adding, deleting or modifying a relevant Software Component Management Object (SCOMO) of the DM tree in the terminal device. The software components in the terminal device may include an executable application program, a Dynamic Link Library, an UI interface, etc. which are provided by many software providers.

For a software component inhered in a terminal device, a corresponding MO is pre-configured in a DM tree in the terminal device. For example, during the installation of a DM Agent in the terminal device, the DM Agent scans all the software components which have already been installed in the terminal device, generates corresponding MOs, and then adds the generated corresponding MOs to the DM tree. For a software component sent by a DMS to the terminal device, a corresponding MO is generated by an operating command sent from the DMS. For a software component downloaded and installed by a user, in the process of downloading and installation of the software component in the terminal device, a Diagnostic and Monitoring (DiagMon) Agent in the terminal device monitors the installation event in the terminal device and reports relevant information about the software component to the DMS. Then the DMS sends a corresponding operating command based on the information reported by the terminal device, and so a corresponding MO is generated.

For each of capability information possessed by a terminal device (the capability information includes hardware capability, software capability, network communication capability, etc. which are possessed by the terminal device itself), it is also necessary to maintain a corresponding DCMO in a DM tree to describe the capability information, so that the DMS can manage and control the respective capability possessed by the terminal device. For example, if the terminal device possesses a capability of connecting a peripheral device, a corresponding DCMO for describing the information on the peripheral device connected to the terminal device is maintained in the DM tree of the terminal device. When a peripheral device is connected to the terminal device, information on the connected peripheral device is shown in the DCMO. When the peripheral device is removed from the terminal device, default information on the connected interface is shown in the DCMO.

Subsequently, when the capability information possessed by the terminal device changes, the information on the corresponding DCMO maintained in the DM tree requires to be updated timely, so as to describe the changed capability information precisely. Thus, the DMS is allowed to correctly manage and control the capability of the device. At present, when device capability information changes, a process for updating the corresponding MO maintained in the DM tree is as follows:

a terminal device monitors whether some capability information possessed by the device changes by itself;

the terminal device reports the changed capability information to a DMS, and the DMS generates an updated DCMO based on the changed capability information reported by the terminal device, and sends the updated DCMO to the terminal device; and the terminal device replaces the relevant DCMO maintained in the DM tree with the updated DCMO sent by the DMS.

However, the manner in which; when capability information in a terminal device is updated dynamically, the terminal device reports the updated capability information to a DMS, and the DMS generates an updated DCMO based on the updated capability information, and sends the updated DCMO to the terminal device, has defects as follows.

1. Reporting the updated device capability information to the DMS has to occupy wireless transmission resources. Additionally, sending the updated DCMO to the terminal device by the DMS is also to occupy the wireless transmission resources. Therefore, it causes to waste the precious wireless transmission resources.

2. The DMS is required to analyze the changed and updated capability information reported by the terminal device, to generate a corresponding DCMO based on the structure of the DCMO, and to send the corresponding DCMO to the terminal device. Thus, if the number of the terminal devices reporting the changed and updated capability information is large, payloads of the DMS for processing tasks are increased, and the DMS' system processing resource is wasted.

3. Because the terminal device reports to the DMS the changed and updated capability information, a certain delay may occur during the transmission. Also, because the DMS sends the generated updated DCMO to the terminal device, a certain delay may occur during the transmission. Therefore, during the said delay, it may cause the DMS to fail to manage the changed capability of the terminal device.

SUMMARY OF THE INVENTION

According to embodiments of the present invention, a method for maintaining a Device Capability Management Object is provided to overcome that in the prior art, when device capability information changes, updating and maintaining of a corresponding DCMO is to waste wireless transmission resources, increase DMS' system processing payloads, and result in delay when updating.

Correspondingly, according to embodiments of the present invention, a method, system and terminal device for managing Device Capability are further provided.

According to embodiments of the present invention, a method for maintaining a Device Capability Management Object is provided including steps of detecting changed capability information in a terminal device by the terminal device, and maintaining a corresponding Device Capability Management Object in a Device Management tree in the terminal device based on the detected changed capability information.

The method further includes a step of reporting, by the terminal device, the detected changed capability information to a Device Management Server.

According to embodiments of the present invention, a terminal device is provided including a capability information change detecting unit adapted to detect changed capability information in the terminal device, and a management object maintaining unit adapted to maintain a corresponding Device Capability Management Object in a Device Management tree based on the changed capability information detected by the capability information change detecting unit.

The terminal device further includes a capability information change reporting unit adapted to report to a Device Management Server the changed capability information detected by the capability information change detecting unit.

According to embodiments of the present invention, a method for managing Device Capability is provided including steps of detecting changed capability information in a terminal device by the terminal device, maintaining a corresponding Device Capability Management Object in a Device Management tree in the terminal device based on the detected changed capability information, reporting the detected changed capability information to a Device Management Server, and managing, by the Device Management Server, the corresponding capability of the terminal device through the corresponding maintained Device Capability Management Object in the Device Management tree based on the changed capability information reported by the terminal device.

According to embodiments of the present invention, a system for managing Device Capability is provided including a terminal device and a Device Management Server, wherein the terminal device includes a capability information change detecting unit adapted to detect changed capability information in the terminal device, a Management Object maintaining unit adapted to maintain a corresponding Device Capability Management Object in a Device Management tree based on the changed capability information detected by the capability information change detecting unit, and a capability information change reporting unit adapted to report to a Device Management Server the changed capability information detected by the capability information change detecting unit, and the Device Management Server is adapted to manage the corresponding capability of the terminal device, through the maintained corresponding Device Capability Management Object in the Device Management tree, based on the changed capability information reported by the capability information change reporting unit in the terminal device.

According to embodiments of the present invention, the terminal device maintains dynamically the corresponding DCMO in the DM tree based on the detected changed capability information, which is different from the prior art in that, the DMS generates the updated information on the corresponding DCMO based on the changed capability information reported by the terminal device, and sends the updated information on the DCMO to the terminal device (in other words, there is no need for intervention from the DMS). Therefore, the precious wireless transmission resources are saved, payloads of the DMS for processing tasks are decreased, and further the long delay may be efficiently overcome which is caused by the maintenance processing for updating the corresponding DCMO by the DMS when the device capability information changes.

According to embodiments of the present invention, the terminal device further reports the detected changed capability information to the DMS. Therefore, the DMS is also allowed to manage the changed capability in the terminal device, through invoking respective node in the DCMO updated and maintained by the terminal device itself. In this way, Device Capability management in maintaining the relevant information on the DCMO based on the detected changed capability information by the terminal device itself is efficiently achieved.

DETAILED DESCRIPTION OF THE INVENTION

In order to overcome those technical drawbacks in the prior art above, according to embodiments of the present invention, when a terminal device detects changed capability information in itself, the terminal device directly updates and maintains a corresponding DCMO in a DM tree based on the changed capability information, without generating, by a DMS, a new DCMO based on the information on the changed capability reported by the terminal device and sending the new DCMO to the terminal device. Therefore, the precious wireless transmission resources are saved, payloads of the DMS for processing tasks are decreased, and the delay due to updating and maintaining of the DCMO is reduced.

Hereinafter, with reference to the accompanied drawings, the operating principle, the embodiments and the beneficial effect of the solution of the present invention will be described in detail.

Figure 1:
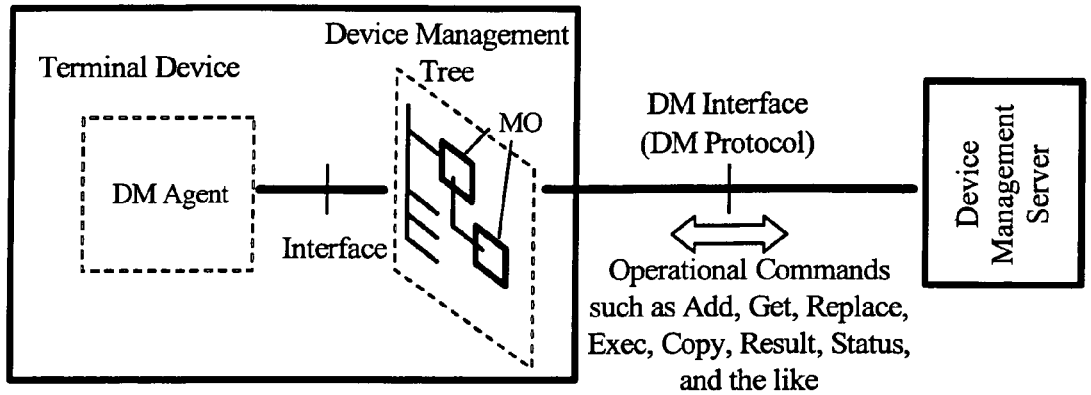
FIG. 1 is a model view illustrating an overall management architecture according to the DM specification in the prior art.
Figure 2:
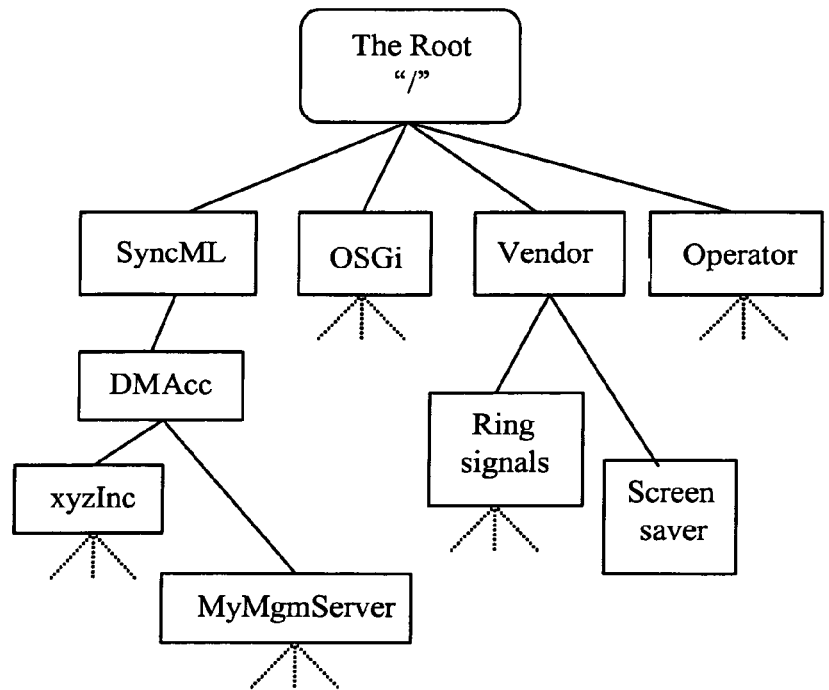
FIG. 2 is a structural status diagram illustrating respective Management Objects in a DM tree of a terminal device in the prior art.
Figure 3:
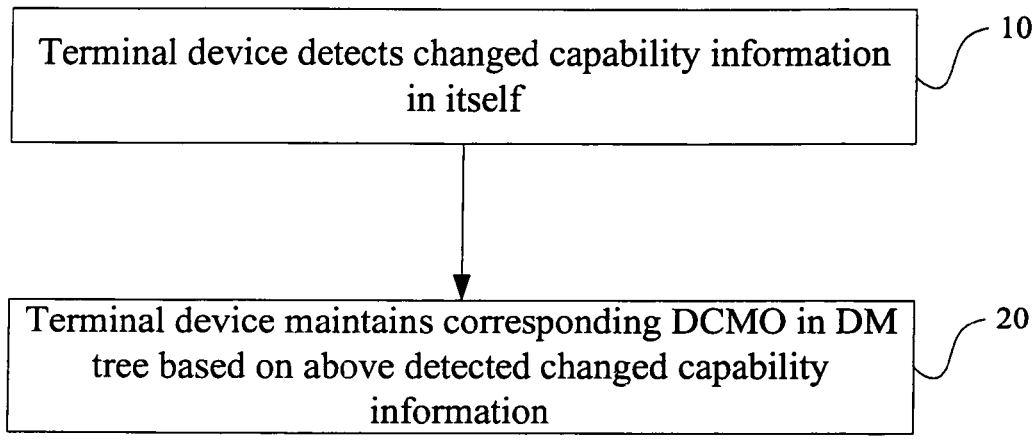
FIG. 3 is a flowchart illustrating a method for maintaining a Device Capability Management Object according to embodiments of the present invention.

FIG. 3 is a flowchart of a method for maintaining a Device Capability Management Object according to embodiments of the present invention. The detailed procedure is as follows.

At Block 10, a terminal device detects changed capability information in itself. For the purpose of this, a preferred embodiment is that the terminal device uses a DiagMon client in itself to detect automatically the device capability information, so as to detect the changed capability information.

Another preferred embodiment is that when receiving a command sent from outside for triggering a terminal device to scan and refresh capability information, the terminal device scans and refreshes the capability information to detect the changed capability information. For example, when a terminal device receives a command sent from a DMS for triggering an executable node Refresh in a DM tree or for triggering an executable node Scan in the DM tree, an underlying program is invoked by a DCMO client in the terminal device to refresh or scan the capability information in itself, so that the changed capability information may be detected.

At Block 20, the terminal device maintains a corresponding DCMO in the DM tree based on the changed capability information detected as above. This procedure may be implemented in the following three cases.

In the first case, when the changed capability information detected as above by the terminal device refers to newly added capability information, the terminal device may extract information defined in a DDF from the detected newly added capability information based on DDF information pre-defined for the DCMO, and then add respective extracted information to respective node in the DCMO defined according to the DDF. Thus, generating of the corresponding DCMO in the DM tree is accomplished.

In the second case, when the changed capability information detected as above by the terminal device refers to changed existing capability information, the terminal device updates information on relevant nodes of the corresponding DCMO in the DM tree, based on the detected changed existing capability information.

In the third case, when the changed capability the information detected as above by the terminal device refers to removal of existing capability information, the terminal device deletes the corresponding DCMO from the DM tree, based on the detected removal of the existing capability information.

Hereinafter, a case in which new hardware capability is inserted into some connection interface of a terminal device, such as that a Mp3 device or a camera device or the like is inserted into a USB interface of a terminal device, is used as an example to make a detailed description of embodiments of the present invention.

A DiagMon client in a terminal device may be used in real time for monitoring changed capability information in the terminal device. When plugging of new hardware capability (such as a Mp3 device or a camera device or the like) into a relevant USB interface is detected, based on structure information of a DCMO DDF pre-defined for the hardware capability plugged in or out from the USB interface, the corresponding required information, such as ID, Name, Description, Status, Drive data, operation Enabled, etc. of the device capability, are extracted from the detected capability information of the new plugged-in hardware. The extracted Status information is whether drive data of the presently plugged-in hardware capability has been loaded, whether the status is an enabled status or a disabled status, etc. If the drive data for the plugged-in hardware capability has existed in the terminal device, the extracted drive data is directly loaded into the plugged-in hardware capability, and if there is no drive data for the plugged-in hardware capability in the terminal device, or the drive data in the terminal device is too old, the terminal device may report the plugged-in hardware capability information to the DMS, and furthermore the DMS sends the newest drive data to the terminal device. The extracted information on allowed operation refers to allowed operation types for the DMS to the plugged-in hardware capability, such as whether updating of the drive data is allowed or not, whether removing of the drive data is allowed or not, whether the enabling/disabling operation is supported or not, etc.

In addition, for the hardware capability in the terminal device, when the hardware capability itself conforms to requirement for the DM, the terminal device also gets existing information on MO of the hardware capability, and adds the information to the nodes under the corresponding DCMO in the DM tree.

A part of the information extracted by the terminal device, such as Description information, may be extracted from the plugged-in hardware capability. The other part of the information, such as allowed operation information, Status, etc. for the plugged-in hardware capability, may be extracted from the driver program of the plugged-in hardware capability, since such information requires to be determined according to information on the driver program of the plugged-in hardware capability.

Figure 4:
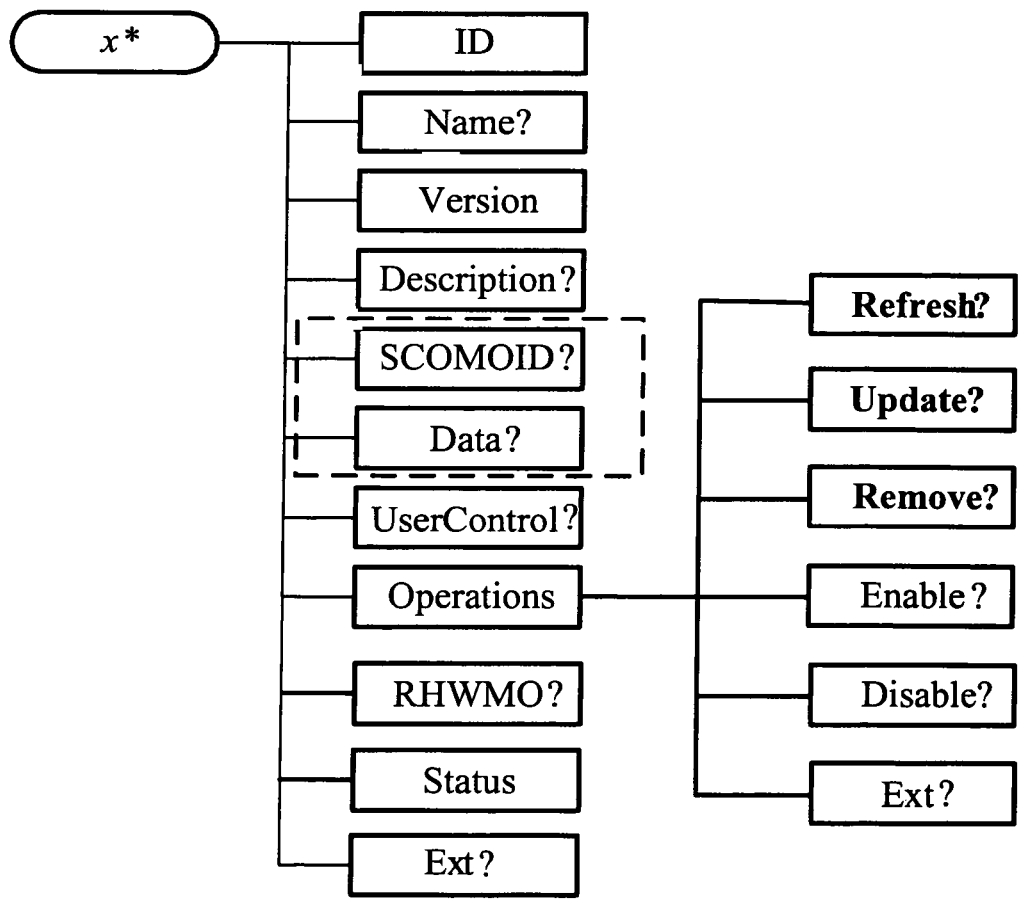
FIG. 4 is a Device Description Framework (DDF) frame structure based on which a terminal device generates a new DCMO in a DM tree.

The terminal device writes the extracted information into corresponding node of the DCMO based on the pre-defined DDF, so that the corresponding DCMO is generated in the DM tree. A DDF framework based on which the terminal device generates a new DCMO in the DM tree is shown in FIG. 4. The meaning represented by respective node in the DDF structure is explained as follows.

| Node: x | | |
|---|---|---|
| Tree Occurrence | Format | Min. Access Types |
| ZeroOrMore | Node | Get |

This interior node is a placeholder node, under which respective capability information in the terminal device is stored.

| Node: <x>/<ID> | | |
|---|---|---|
| Tree Occurrence | Format | Min. Access Types |
| One | Chr | Get |

This node is used for storing the identifier of the corresponding capability in the terminal device.

| Node: <x>/<Name> | | |
|---|---|---|
| Tree Occurrence | Format | Min. Access Types |
| ZeroOrOne | Chr | Get |

This node is used for storing the name of the corresponding capability in the terminal device.

| Node: <x>/<Version> | | |
|---|---|---|
| Tree Occurrence | Format | Min. Access Types |
| One | Chr | Get |

This node is used for storing the version of the DCMO Enabler, such as version 1.0.

| Node: <x>/<Description> | | |
|---|---|---|
| Tree Occurrence | Format | Min. Access Types |
| ZeroOrOne | Chr | Get |

This node is used for storing the description information of the corresponding capability in the terminal device.

| Node: <x>/<SCOMOID> | | |
|---|---|---|
| Tree Occurrence | Format | Min. Access Types |
| ZeroOrOne | Chr | Get |

This node is used for storing the SCOMO ID information of the corresponding drive data for the device capability. The ID is used as an index for searching the drive data for the corresponding capability on the corresponding SCOMO.

| Node: <x>/<Data> | | |
|---|---|---|
| Tree Occurrence | Format | Min. Access Types |
| ZeroOrOne | Chr | Get |

This node is used for storing the corresponding drive data for the capability in the terminal device directly. In the DDF structure of the DCMO, one of this node and the above node <x>/<SCOMOID> may be selected.

| Node: <x>/<UserControl> | | |
|---|---|---|
| Tree Occurrence | Format | Min. Access Types |
| ZeroOrOne | Chr | Get |

This node is used for indicating operation authority for the corresponding capability in the terminal device assigned to the user, such as whether the user is allowed to enable or disable the capability.

| Node: <x>/<Operations> | | |
|---|---|---|
| Tree Occurrence | Format | Min. Access Types |
| One | Node | Get |

This interior node is a parent node of operations that the DMS issues to the corresponding capability in the terminal device.

| Node: <x>/<Operations>/<Refresh> | | |
|---|---|---|
| Tree Occurrence | Format | Min. Access Types |
| ZeroOrOne | Boolean | Get, Exec |

This node is an executable node, and the DMS invokes it to refresh capability information for the device. The DMS may also send the command Exec to the executable node Refresh of some DCMO in the terminal device, so that the DMS instructs the terminal device to refresh all capability information in the terminal device through invoking the executable node.

| Node: <x>/<Operations>/<Update> | | |
|---|---|---|
| Tree Occurrence | Format | Min. Access Types |
| ZeroOrOne | Boolean | Get, Exec |

This node is an executable node, and the DMS invokes it to upgrade the drive data for the corresponding capability in the terminal device.

| Node: <x>/<Operations>/<Remove> | | |
|---|---|---|
| Tree Occurrence | Format | Min. Access Types |
| ZeroOrOne | Boolean | Get, Exec |

This node is an executable node, and the DMS invokes it to remove the drive data for the corresponding capability in the terminal device.

| Node: <x>/<Operations>/<Enable> | | |
|---|---|---|
| Tree Occurrence | Format | Min. Access Types |
| ZeroOrOne | Boolean | Get, Exec |

This node is an executable node, and the DMS invokes it to enable the relevant capability in the terminal device.

| Node: <x>/<Operations>/<Disable> | | |
|---|---|---|
| Tree Occurrence | Format | Min. Access Types |
| ZeroOrOne | Boolean | Get, Exec |

This node is an executable node, and the DMS invokes it to disable the relevant capability in the terminal device.

| Node: <x>/<Operations>/<Ext> | | |
|---|---|---|
| Tree Occurrence | Format | Min. Access Types |
| ZeroOrOne | Boolean | Get |

This node is reserved for extension, which may be used for extending other executable commands of the DMS for the relevant capability in the terminal device.

| Node: <x>/<Status> | | |
|---|---|---|
| Tree Occurrence | Format | Min. Access Types |
| One | Chr | Get |

This node is used for representing the current status of the relevant capability in the terminal device.

| Node: <x>/<RHWMO> | | |
|---|---|---|
| Tree Occurrence | Format | Min. Access Types |
| ZeroOrOne | Node | Get |

This node is a container node for storing existing information on MO of the Removable Hardware (RHW) capability in the terminal device.

| Node: <x>/<Ext> | | |
|---|---|---|
| Tree Occurrence | Format | Min. Access Types |
| ZeroOrOne | Node | Get |

This interior node is a placeholder node for extension use of subsequent capability information.

According to the above DCMO DDF framework, when a terminal device detects plugging of new hardware capability into a corresponding USB interface, a corresponding DCMO is generated in a DM tree, the procedure of which is as follows:

1. the terminal device reads structure information of a DCMO DDF pre-defined in the DM tree;

2. according to the structure information of the DDF which the terminal device reads, the terminal device adds in turn node <ID>, node <Name>, node <Description> etc. of the plugged-in hardware capability to respective node of the DCMO in the DM tree;

3. if the drive data to be loaded to the plugged-in hardware capability is stored in a certain SCOMO, the SCOMO ID information is added into the node <SCOMOID> of the DCMO, and the terminal device searches the corresponding SCOMO for information on the corresponding drive data based on the information on the SCOMO ID, and installs the drive data;

the drive data to be loaded to the plugged-in hardware capability may also be stored directly in the node <Data> of the DCMO;

4. the terminal device gets the current status information of the plugged-in hardware capability, and adds it to the node <Status> of the DCMO;

5. operation information to be performed on the plugged-in hardware capability by the DMS is acquired, such as that the DMS is allowed to perform updating the drive data or removing the drive data or the like on it, and the allowed operation type information is added to respective sub-node under the node <Operations>; and 6. an Access Control List (ACL) for all the nodes of the DCMO is assigned to a certain DMS such as a default DMS, or the ACL for all the nodes is assigned null, thus the ACL value of the root node is inherited.

For changed hardware capability information caused by two timings when the relevant hardware capability is plugged in and plugged out from the USB interface in the terminal device, the terminal device may update and maintain the corresponding DCMO in the DM tree in the following four manners.

In the first manner, the terminal device maintains a corresponding default DCMO beforehand in the DM tree for each hardware connection interface in the terminal device, respectively. When a certain hardware capability is connected to a certain interface of the terminal device, the terminal device updates information on respective node of the DCMO of the corresponding interface according to the connected hardware capability information. Further, when that hardware capability is removed from that interface of the terminal device, the terminal device restores information on each node in the corresponding DCMO into initial default information.

Figure 5:
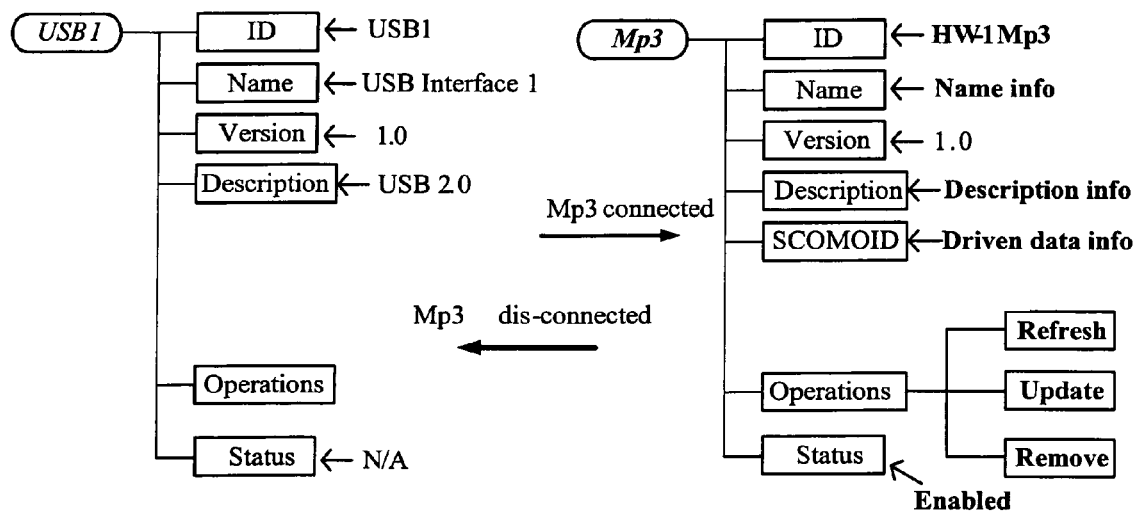
FIG. 5 is a diagram illustrating updating of a corresponding DCMO when a Mp3 hardware is connected to a USB interface of a terminal device and when it is plugged out from the USB interface according to embodiments of the present invention.

In other words, the terminal device generates original information on the DCMO for each connection interface beforehand. The original information on the DCMO is pre-configured in the terminal device. For example, when a DM Agent is being installed in the terminal device, the terminal device will scan respective connection interface, and generate corresponding default information on the DCMO for the respective connection interface. Thus, subsequently when some hardware capability is connected to some interface of the terminal device, the terminal device updates the default information on respective node in the corresponding DCMO into the connected hardware capability information, and when that connected hardware capability is removed, the terminal device restores information on respective node in the corresponding DCMO into the default information on the status. FIG. 5 is a schematic diagram illustrating updating of a corresponding DCMO when a Mp3 hardware is connected to a USB interface of a terminal device and when it is plugged out from the USB interface according to embodiments of the present invention.

Figure 6:
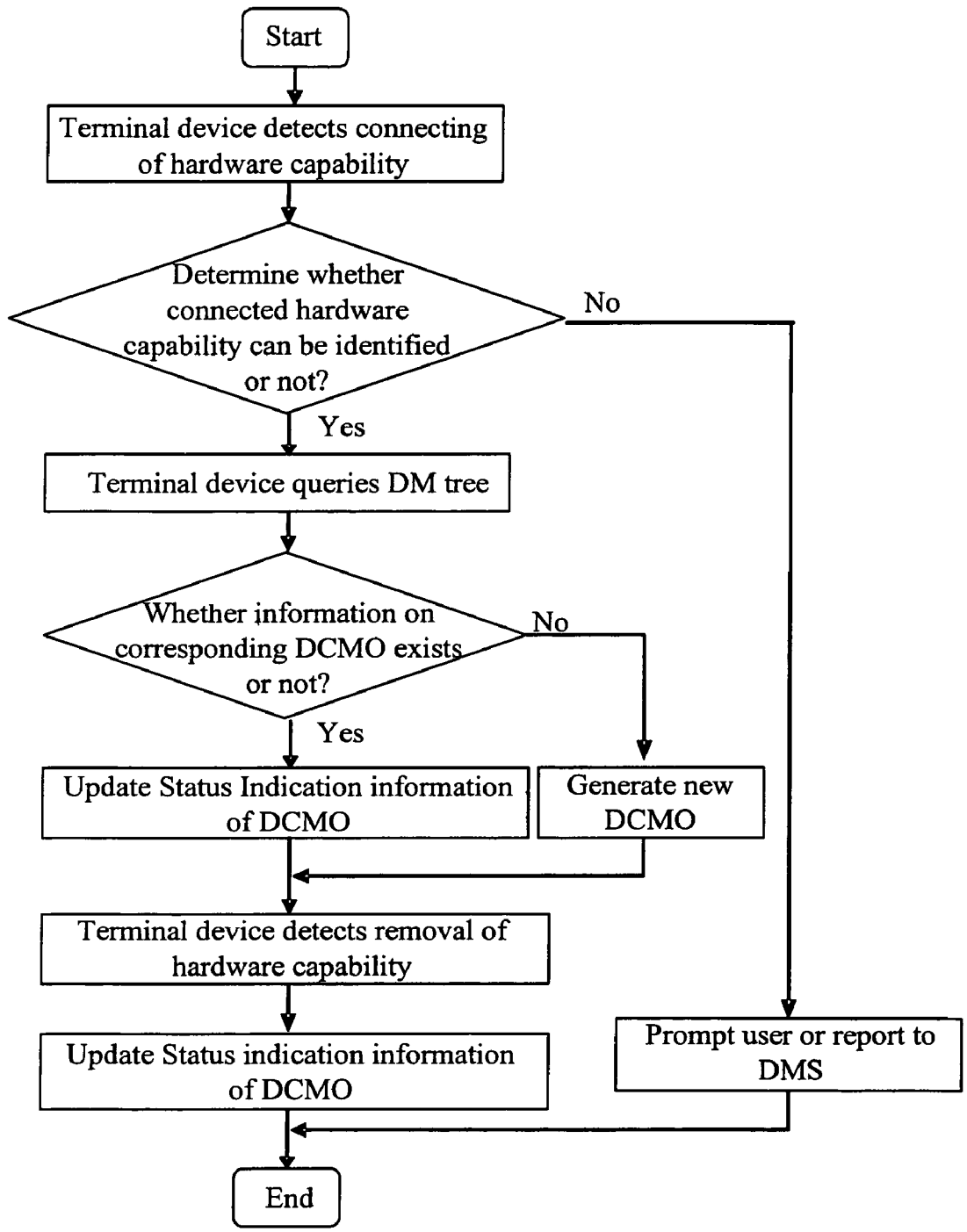
FIG. 6 is a flowchart illustrating updating of a DCMO when a hardware capability is connected to a USB interface of a terminal device and when it is plugged out from the USB interface according to embodiments of the present invention.

In the second manner, when some hardware capability is plugged in a USB connection interface of a terminal device for the first time, the terminal device generates a new DCMO corresponding to that hardware capability in a DM tree. Subsequently when that hardware capability is removed or plugged in again, only the status indication information in the corresponding DCMO is updated without modifying any information on other nodes. For example, when some hardware capability is connected to a terminal device, the terminal device firstly identifies that hardware capability. If the terminal device can not identify that hardware capability, the reason may be that the hardware capability itself is destroyed, or that no corresponding driver program exists, and the terminal device may indicate or report that the terminal device can't identify the hardware capability to the user or the DMS. If the terminal device can identify the hardware capability, the terminal device queries the DM tree in itself, and determines whether the corresponding DCMO information has already been existed. If existed, the terminal device updates the status information of the status indication node, for example, the status information of the status indication node is set to be status Connected. If not existed, the terminal device adds the corresponding DCMO information into the DM tree. When the hardware capability is removed from the connection interface of the terminal device, the terminal device updates information on the status indication node of the corresponding DCMO in the DM tree into status Unconnected. In this manner, when the DMS queries the hardware capability information of the terminal, device, only information on the status indication node of the DCMO corresponding to the hardware capability needs to be queried. If the status indication information of the node is "Unconnected", even though the DMS may find the DCMO information of the hardware capability in the DM tree in the terminal device, the DMS can not perform any operational management on the hardware capability. FIG. 6 is a flowchart illustrating updating of a corresponding DCMO when a hardware capability is connected to a USB interface of a terminal device and when it is plugged out from the USB interface according to embodiments of the present invention.

In the third manner, when some hardware capability is plugged in a USB connection interface of a terminal device for the first time, the terminal device generates a new DCMO corresponding to the hardware capability in a DM tree. Subsequently when the hardware capability is plugged in or out from the terminal device, the terminal device only modifies attribute <Access Type> of respective node of the corresponding DCMO. That is because each node of the DCMO includes attribute Access Type, which indicates that the DMS may perform operational management on these nodes, such as operating commands Get, Replace, Delete, or the like.

Based on plugging in or out of the hardware capability from the USB interface, the terminal device can modify attribute <Access Type> of respective node in the corresponding DCMO to control operational management of the DMS to the hardware capability. For example, when a hardware capability is removed from the terminal device, the terminal device may configure attribute <Access Type> of all nodes of the corresponding DCMO as NULL, which indicates that the terminal device refuses any DMS to manage and control the corresponding hardware capability via the DCMO. In this way, although respective node of the DCMO still exists in the DM tree, these nodes are invisible to the DMS. Therefore, the management for the removed hardware capability, is not allowed. When that hardware capability is connected to the terminal device again, attribute <Access Type> of respective node of the DCMO corresponding to that hardware capability is restored to the original default value, the respective node of the DCMO is opened to some DMS(s), and the relevant DMS(s) is allowed to manage and control the connected hardware capability via corresponding DCMO. Thus the DMS is allowed to operate and manage the connected hardware capability. Then, the DMS can perform management operation on the hardware capability.

Figure 7:
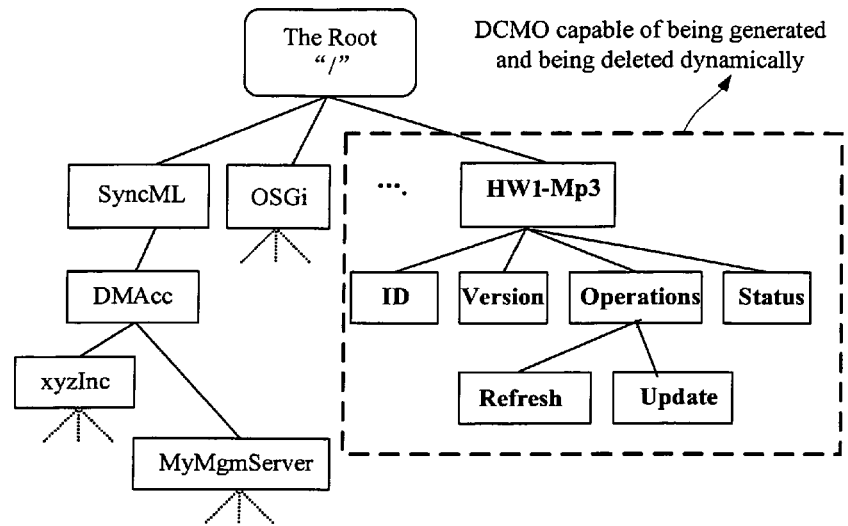
FIG. 7 is a diagram illustrating the changed status of a corresponding DCMO in a DM tree when a Mp3 hardware is connected to a USB interface of a terminal device and when it is plugged out from the USB interface according to embodiments of the present invention.

In the fourth manner, when a hardware capability is connected to a connection interface of a terminal device for the first time, the terminal device generates a new DCMO corresponding to the hardware capability. When the hardware capability is removed from the connection interface of the terminal device, the terminal device deletes the corresponding DCMO generated in the DM tree. FIG. 7 is a status diagram illustrating changing of a corresponding DCMO in a DM tree when Mp3 hardware is connected to a USB interface of a terminal device and when it is plugged out from the USB interface according to embodiments of the present invention. When the Mp3 is connected to the terminal device, the terminal device generates dynamically a DCMO corresponding to the Mp3 hardware capability in the DM tree (shown in the dashed frame of FIG. 7). When the Mp3 hardware capability is removed from the connection interface of the terminal device, the terminal device deletes the DCMO generated dynamically as above in the DM tree.

The terminal device may select one of the four manners described above according to circumstances, to maintain a DCMO corresponding to a hardware capability which can be plugged in and out to a connection interface of a terminal device. Further, the terminal device may report the detected changed capability information to the DMS, so that the DMS manages information on respective node of the relevant DCMO maintained by the terminal device itself.

As can be seen from the principle of the methods and the implementing procedures for maintaining the DCMO described above according to embodiments of the present invention, the terminal device detects the changed capability information and maintains dynamically a corresponding DCMO itself in the DM tree based on the detected changed capability information according to embodiments of the present invention. That is to say, it is not necessary for the DMS to determine a updated DCMO based on the changed capability information reported by the terminal device and send the updated DCMO to the terminal device (in other words, there is no need for intervention from the DMS). Therefore, the precious wireless transmission resources are saved, payloads of the DMS for processing tasks are decreased, and further the long delay may be efficiently overcome which is caused by the maintenance processing for updating the corresponding DCMO by the DMS when the device capability information changes.

Figure 8:
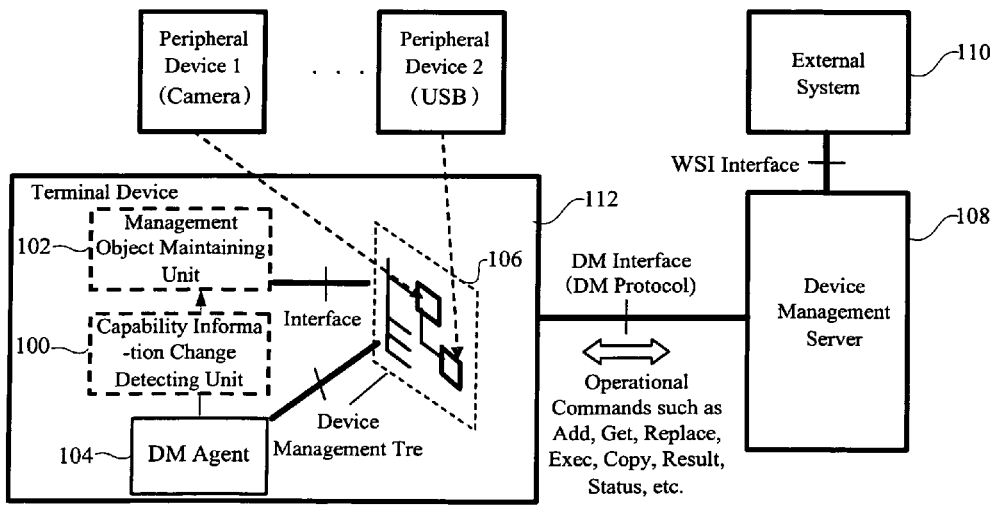
FIG. 8 is a structural block diagram illustrating a terminal device according to embodiments of the present invention.

Corresponding to the method for maintaining the DCMO described above, a terminal device is further provided according to embodiments of the present invention. FIG. 8 is a structural block diagram illustrating a terminal device according to embodiments of the present invention, the terminal device including a capability information change detecting unit 100 and a management object maintaining unit 102. The particular operating principle of the terminal device with the above two components added according to embodiments of the present invention is as follows.

The DMS 108 is used for managing and controlling the terminal device 112, such as performing software downloading on the terminal device 112, configuring parameters on the terminal device 112, diagnosing and monitoring the terminal device 112, etc. The DMS 108 interacts with the terminal device via DM protocol, so as to manage the terminal device.

The external system 110 interacts with the DMS 108 via Web Service Interface (WSI), so as to submit respective operation request to the DMS 108, and the DMS 108 initiates a corresponding management operation to the terminal device 112.

The terminal device 112 includes an underlying firmware (not shown in the Figure), a DM Agent 104, a capability information change detecting unit 100, and a management object maintaining unit 102. Additionally, a DM tree 106 is stored in the terminal device.

The DM Agent 104 is adapted to interact with the DMS 108, so as to receive, manifest, and implement respective management command sent by the DMS 108.

The capability information change detecting unit 100 is adapted to detect the changed capability information in the terminal device automatically or based on the indication information sent by the DMS 108. The function of the capability information change detecting unit 100 may be achieved by a DiagMon Client in the terminal device 112, or by invoking a underlying program by a DCMO Client (not shown in the Figure) in the terminal device.

The management object maintaining unit 102 is adapted to maintain a corresponding DCMO in the DM tree 106 based on the changed capability information detected by the capability information change detecting unit 100. In other words, based on the changed capability information detected by the capability information change detecting unit 100, the management object maintaining unit 102 generates a new DCMO in the DM tree 106, updates the existing DCMO, deletes the existing DCMO, or the like.

Relevant MOs are stored in the DM tree 106, including a DCMO, a SCOMO, a firmware updating MO, a connection parameter MO, a scheduling task MO, a DiagMon MO, etc.

FIG. 8 shows an example in which peripheral device capacity connected to the terminal device 112 is used as terminal device capability. Here, the peripheral device capacity connected to the terminal device 112 includes, but not limited to a camera device, a Bluetooth device, an infrared device, or the like.

The capability information change detecting unit 100 in the terminal device 112 described above may detect the changed capability information through monitoring/detecting the device capability information 112 in real time. Preferably, the function of this functional entity may be accomplished by the DiagMon capability of the DiagMon Client.

In the terminal device shown in FIG. 8, if the changed capability information detected by the capability information change detecting unit 100 refers to newly added capability information, the management object maintaining unit 102 generates a DCMO corresponding to the newly added capability in the DM tree, based on information on the pre-defined structure of the DCMO DDF, according to the newly added capability information detected by the capability information change detecting unit 100. If the changed capability information detected by the capability information change detecting unit 100 refers to changed existing capability information, the management object maintaining unit 102 updates information on the relevant nodes of the corresponding DCMO in the DM tree, based on the changed existing capability information detected by the capability information change detecting unit 100. If the changed capability information detected by the capability information change detecting unit 100 refers to removal of existing capability information, the management object maintaining unit 102 deletes the corresponding DCMO in the DM tree, based on the result of the removal of the existing capability information detected by the capability information change detecting unit 100.

Figure 9:
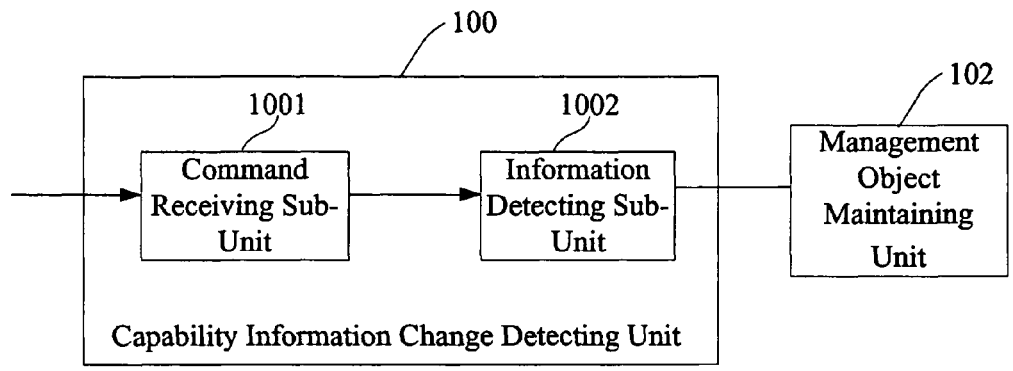
FIG. 9 is a structural block diagram illustrating a capability information change detecting unit in a terminal device according to embodiments of the present invention.

Furthermore, FIG. 9 is a structural block diagram illustrating a capability information change detecting unit in a terminal device according to embodiments of the present invention. The capability information change-detecting unit 100 in the terminal device 112 described above may also detect the changed capability information by scanning and updating the capability information in the terminal device 112, upon receiving the relevant command sent from outside (such as the relevant commands sent by the DMS 108 or by a user). Thus, the function of the capability information change detecting unit 100 may be accomplished by the following two component sub-units:

a command receiving sub-unit 1001, adapted to receive a command sent from outside (a DMS or a user) for triggering the terminal device to scan and update the capability information in itself, such as triggering a command to Refresh an executable node in the DM tree, or a command to Scan an executable node in the DM tree sent from the DMS; and an information detecting sub-unit 1002, adapted to detect the changed capability information through scanning and updating the device capability information, when the command receiving sub-unit 1001 described above receives the command sent from outside.

Figure 10:
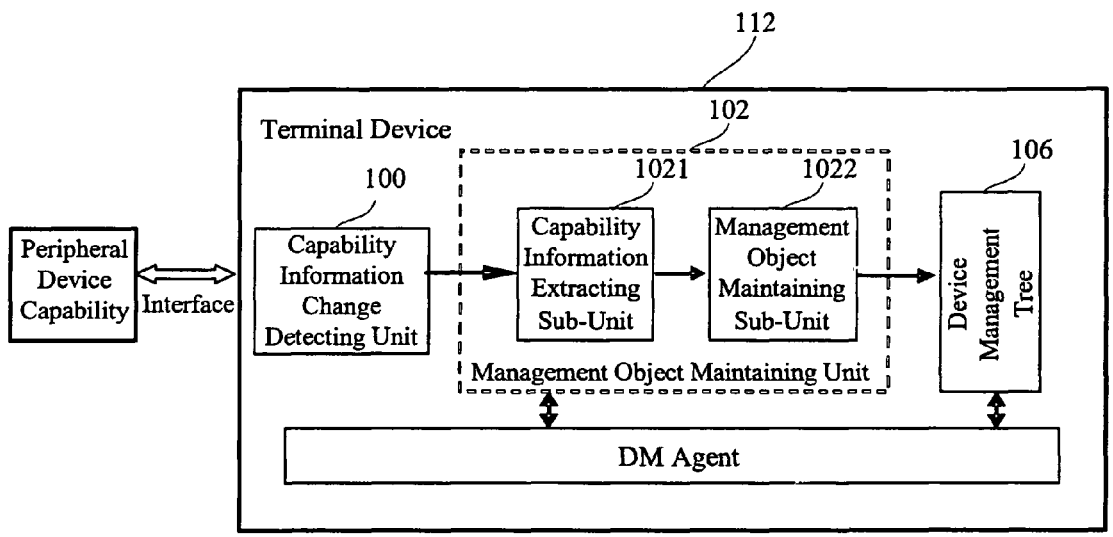
FIG. 10 is a structural block diagram illustrating a Management Object maintaining unit in a terminal device according to embodiments of the present invention.

The management object maintaining unit 102 may generate or update the corresponding DCMO in the DM tree according to the information on the pre-defined structure of the DCMO DDF based on the detected changed capability information. FIG. 10 is a structural block diagram illustrating a management object maintaining unit in a terminal device according to embodiments of the present invention. The management object maintaining unit 102 includes a capability information extracting sub-unit 1021 and a management object maintaining sub-unit 1022. The operating procedure of each entity in FIG. 10 is as follows.

A capability information change detecting unit 100 is adapted to detect changed capability information in the terminal device 112. For example, when some peripheral device capability is connected to the terminal device 112, the capability information change detecting unit 100 can detect the connected peripheral device capability automatically, or detect the peripheral device capability through scanning respective peripheral device interface in the terminal device 112 upon receiving command Refresh or command Scan sent by the DMS.

A capability information extracting sub-unit 1021 is adapted to extract the corresponding capability information such as information on ID, Name, Description, Current Status, etc. from the changed capability information detected by the capability information change detecting unit 100, according to the pre-defined structure of the DCMO DDF. A part of the extracted capability information is the capability information itself, and another part is information on the driver program corresponding to the capability.

A management object maintaining sub-unit 1022 is adapted to generate new DCMO information or update information on the respective node on an existing DCMO (of course, it is also adapted to delete the corresponding DCMO in the DM tree when some capability is removed from the terminal device) according to a pre-defined structural information of DDF based on respective capability information extracted by the capability information extracting sub-unit 1021. In other words, if there is no added capability information in the DM tree, a DCMO corresponding to the added capability is generated, including Description information, required operation information, etc. If there is original information or default information on the DCMO of the capability in the DM tree, only information on the corresponding nodes of the DCMO is updated such as node <Status>, node <Description>, etc.

The function of the management object maintaining unit 102 may be accomplished by the capability of the existing DCMO Client (not shown in the Figure) in the terminal device 112.

Figure 11:
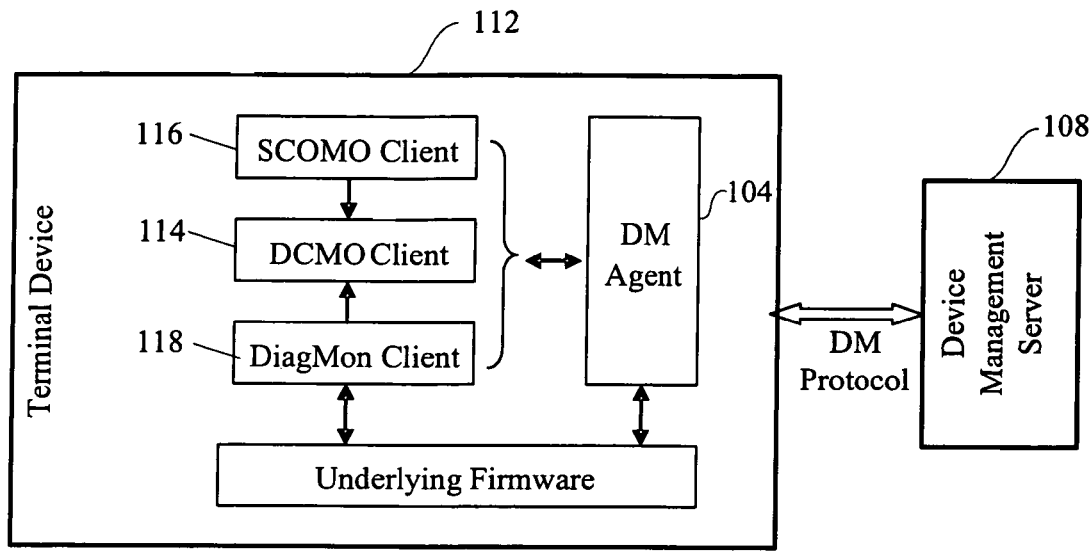
FIG. 11 is a diagram illustrating the particular operating relationship between respective clients in a terminal device according to embodiments of the present invention.

In the terminal device described above, if the existing DiagMon Client is used to accomplish the function of the capability information change detecting unit 100, and the existing DCMO Client is used to accomplish the function of the management object maintaining unit 102, the particular operating relationship among respective client in the terminal device is as shown in FIG. 11, in which:

a SCOMO Client 116 is adapted to manage the software components in the terminal device, and perform downloading, installing and removing of the drive data for the corresponding capability in the terminal device;

a DiagMon Client 118 is adapted to diagnose the fault occurring in the terminal device and monitor changing of performance of the terminal device, which may be used for monitoring changing of the hardware capability in the terminal device;

a DCMO Client 114 is adapted to manage the capability of the terminal device, which may be used for maintaining a corresponding DCMO in the DM tree based on the changed capability information monitored by the DiagMon Client 118; and a DM Agent 104 is adapted to interact with the DMS 108, so that the DMS 108 may manage and control the terminal device 112.

Furthermore, the terminal device according to embodiments of the present invention may further include a capability information change reporting unit adapted to report the information on the changed capability detected by the above capability information change detecting unit to the DMS, so that subsequently the DMS may manage information on respective node in the relevant DCMO maintained by the terminal device itself.

Figure 12:
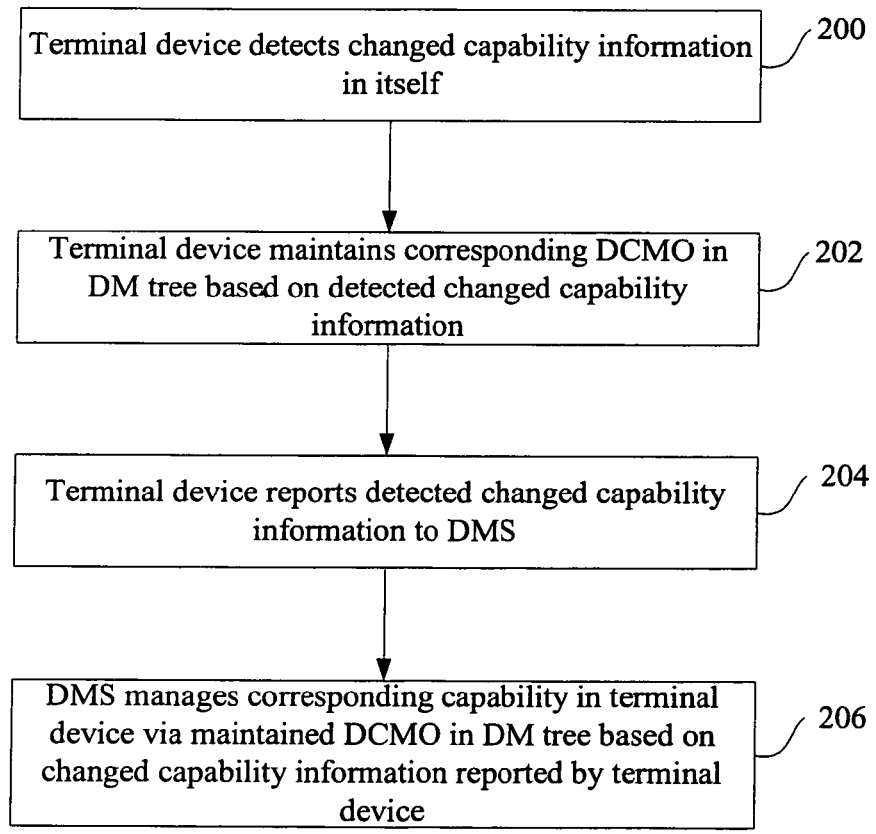
FIG. 12 is a flowchart illustrating a method for managing a Device Capability according to embodiments of the present invention.

Correspondingly, a method for managing a Device Capability is further provided based on the method for maintaining DCMO described above according to embodiments of the present invention. FIG. 12 is a flowchart illustrating a method for managing a Device Capability according to embodiments of the present invention. The operating procedure is as follows.

At Block 200, a terminal device detects changed capability information in itself.

At Block 202, the terminal device maintains a corresponding DCMO in a DM tree based on the changed capability information detected above.

At Block 204, the terminal device reports the changed capability information detected above to a DMS.

At Block 206, the DMS manages the corresponding capability in the terminal device via the maintained DCMO in the DM tree based on the changed capability information reported by the terminal device.

At Block 204 of the above procedure, it is necessary for the DMS to identify the changed capability information reported by the terminal device. In order to achieve this, it is necessary to define a set of capability parameters in the DM protocol, so that the DMS and the terminal device may identify all the capability information according to parameter information in the capability parameter set. In this way, when detecting changed capability information, the terminal device reports the changed capability information to the DMS based on the corresponding parameter information in the capability parameter set, so that the DMS may identify the capability information reported by the terminal device based on the relevant parameter information in the capability parameter set. The following table shows an example of a set of capability parameters negotiated between the terminal device and the DMS.

| Parameter description | Corresponding capability |
| --- | --- |
| Bluetooth | Bluetooth |
| USB | USB interface |
| WLAN | Wireless Local Access Network |
| Infra Red | Infrared interface |
| Serial Interface | Serial interface |
| Parallel Interface | Parallel interface |
| USB Storage Disk | USB memory |
| Mp3 | Mp3 |
| Mp4 | Mp4 |
| Camera | Camera |
| Input Peripheral Device | Input Peripheral Device |
| Output Peripheral Device | Output Peripheral Device |

Based on the above capability parameter set, when the terminal device identifies that Camera hardware capability is newly connected to it, the terminal device searches the capability parameter corresponding to the Camera hardware capability in the above capability parameter set, and reports the searched capability parameter corresponding to the Camera hardware capability to the DMS. Also, the DMS identifies that the capability parameter reported by the terminal device is corresponding to the Camera hardware capability, based on capability parameter information in the capability parameter set.

Preferably, the DMS may update the terminal device capability information through invoking node <Refresh> of the DCMO in the terminal device. The DMS may further upgrade the corresponding drive data of the capability in the terminal device through invoking node <Update> of the DCMO. The DMS may further remove the corresponding drive data of the capability in the terminal device through invoking node <Remove> of the DCMO. In other words, the DMS may not only implement the operation of commands Get, Replace, Delete on respective node in the DCMO, but also send command Exec to the executable nodes such as <Refresh>, <Update>, <Remove>, <Enable>, <Disable>, etc. of the DCMO. The DMS invokes the executable node <Refresh> for refreshing the terminal device capability information, invokes the executable node <Update> for updating the driver program for the corresponding hardware capability, invokes the executable node <Remove> for removing the driver program for the hardware capability, invokes the executable node <Enable> for enabling the relevant hardware capability, and invokes the executable node <Disable> for disabling the relevant hardware capability. When disabled, the relevant hardware capability becomes unavailable.

Figure 13:
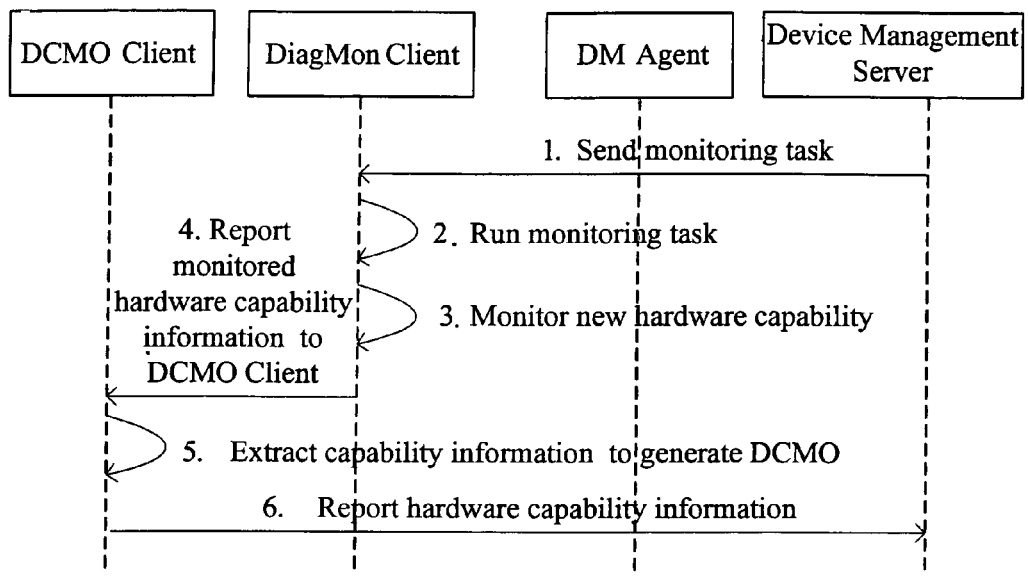
FIG. 13 is a process diagram illustrating a method for managing a Device Capability according to a first embodiment of the present invention.

Hereinafter, a method for managing Device Capability according to embodiments of the present invention will be described in detail, in which a DiagMon Client in a terminal device monitors plugging-in of a new hardware capability into the terminal device, and a DCMO Client in the terminal device maintains corresponding DCMO information according to the result detected by the DiagMon Client, and further the result detected by the DiagMon Client is reported to the DMS. FIG. 13 is a processing process diagram illustrating a method for managing Device Capability according to a first embodiment of the present invention. The particular operating procedure is as following:

1. a DMS sends to a DiagMon Client in a terminal device a monitoring task, which designates hardware capability to be monitored, recording policy and reporting policy of the monitored information;

2. the DiagMon Client in the terminal device runs the monitoring task sent by the DMS;

3. the DiagMon Client monitors that a new hardware capability is connected to the terminal device;

4. the DiagMon Client reports updated information on the monitored hardware capability to a DCMO Client in the terminal device;

5. the DCMO Client extracts the corresponding capability information from the new hardware capability information reported by the DiagMon Client, according to information on a pre-defined structure of the DCMO DDF, and generates a corresponding DCMO in a DM tree; and 6. the DCMO Client reports the new hardware capability information reported by the DiagMon Client to the DMS.

Figure 14:
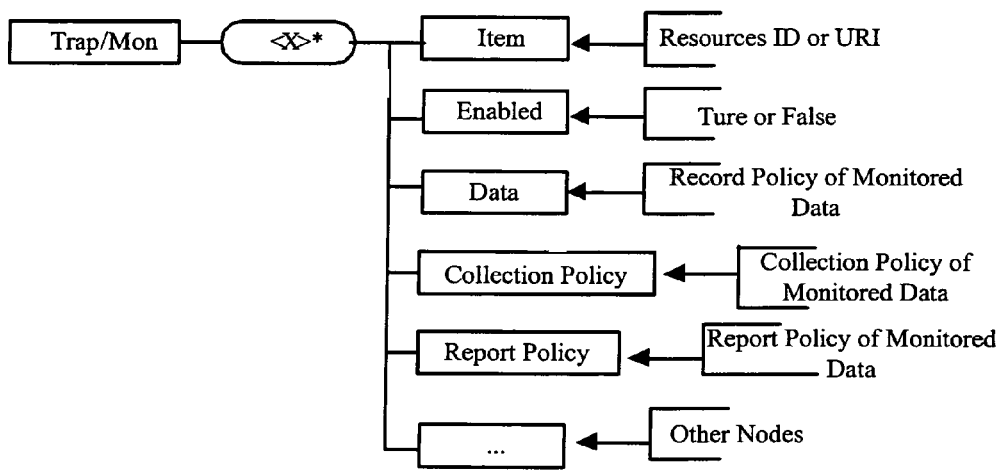
FIG. 14 is a diagram illustrating an embodiment which describes monitoring tasks sent from a DMS to a terminal device according to the first embodiment illustrated in FIG. 13.

Here, the implementation of above Step 1 and Step 6 requires being forwarded via a DM Agent, the procedure of which is omitted herein. A diagram of a monitoring task sent from the DMS to the terminal device described above at Step 1 is as shown in FIG. 14.

A node <Item> designates a hardware capability to be monitored for the terminal device. For example, the terminal device is designated to monitor a USB interface, an Infrared interface, a Bluetooth interface, a built-in Camera interface, etc. In particular, the designation may be made by a resource ID or a Unified Resources Identifier (URI).

A node <Enabled> designates the terminal device to start/stop monitoring the interface capable of plugging in or out to which the relevant hardware capability is connected.

A node <Data> designates the terminal device the manner to record the monitored data.

A node <Collection Policy> designates the terminal device the policy to collect the monitored data.

A node <Report Policy> designates the terminal device the policy to report the monitored data, such as which DMS or Client is to be reported.

After the monitoring task is set by the DMS, the DMS may send the monitoring task to the terminal device for implementation. The terminal device monitors the relevant hardware capability information according to the monitoring task sent by the DMS, records and reports the monitored data based on the requirement of the monitoring task.

Figure 15:
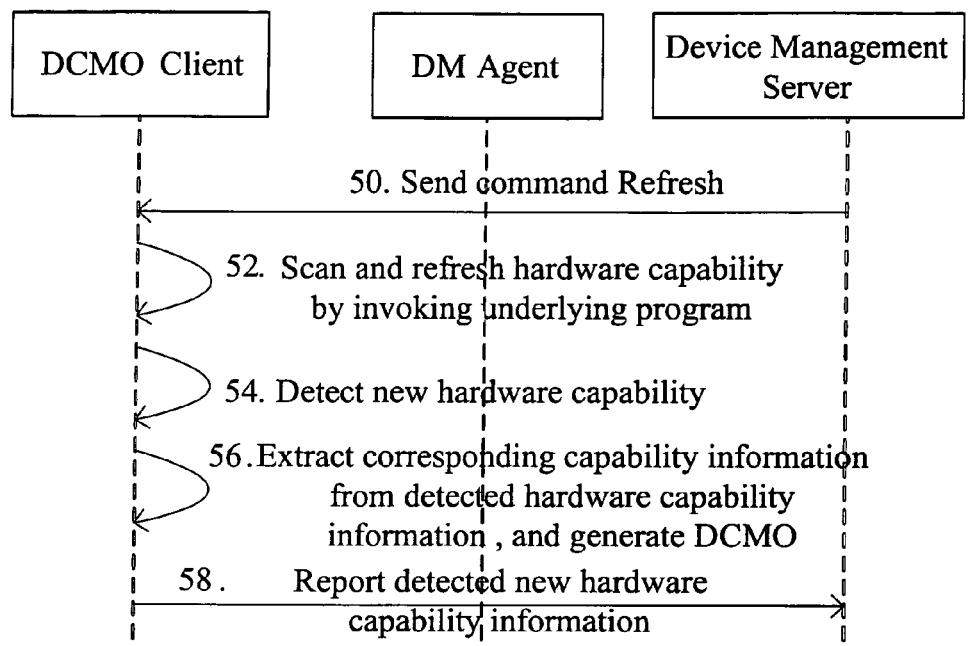
FIG. 15 is a process diagram illustrating a method for managing a Device Capability according to a second embodiment of the present invention.

FIG. 15 is a processing process diagram illustrating a method for managing Device Capability according to a second embodiment of the present invention. In the present embodiment, a DMS sends command Refresh to a DCMO Client in a-terminal device, and then the DCMO Client detects plugging in of a new hardware capability by invoking the underlying program, and generates a corresponding DCMO in a DM tree, and further reports the detected new hardware capability information to the DMS. The particular operating procedure is as follows:

50. the DMS sends command Refresh to the DCMO Client in the terminal device, instructing the DCMO Client to refresh the relevant hardware capability information in the terminal device;

the particular format of command Refresh sent by the DMS is as follows:

```
<Exec>
    <CmdID>3</CmdID>
    <Item>
        <Target>
            <LocURI>./USB1/Operations/Refresh</LocURI>
        </Target>
    </Item>
</Exec>
```

52. when receiving command Refresh from the DMS, the DCMO Client scans and refreshes the hardware capability of the terminal device by invoking the underlying program, in which the invoked underlying program may be an internal functional module of the DCMO Client, or other functional modules of the underlying function of the system;

54. the underlying program detects plugging-in of a relevant new hardware capability into the terminal device;

56. the DCMO Client extracts the new hardware capability information detected by the underlying program, and generates a corresponding new DCMO in the DM tree; and 58. the DCMO Client reports the new hardware capability information connected to the terminal device to the DMS. The particular format of command Report is as follows:

```
<Alert>
  <CmdID>2</CmdID>
  <Data>1226</Data>   <!--Generic Alert-->
  <Correlator>abc123</Correlator>
  <Item>
    <Source><LocURI>./USB1/Operations/Refresh</LocURI></Source>
    <Meta>
        <Type
xmlns=
"syncml:metinf">x-oma-application:syncml.dcmo.refreshresults</Type>
        <Format xmlns="syncml:metinf">xml</Format>
        <Mark xmlns="syncml:metinf">critical</Mark> <!—Optional-->
    </Meta>
    <Data>
    <!--Client Alert Data Goes Here-->
    </Data>
  </Item>
</Alert>
```

As can be seen from above, according to the embodiments of the present invention, the terminal device reports the detected changed capability information to the DMS, thus the DMS is also allowed to manage the changed capability in the terminal device by invoking respective node of the DCMO updated and maintained by the terminal device itself. Therefore, the management on the Device Capability can be implemented by the terminal device itself through maintaining relevant DCMO information based on the detected changed capability information.

Figure 16:
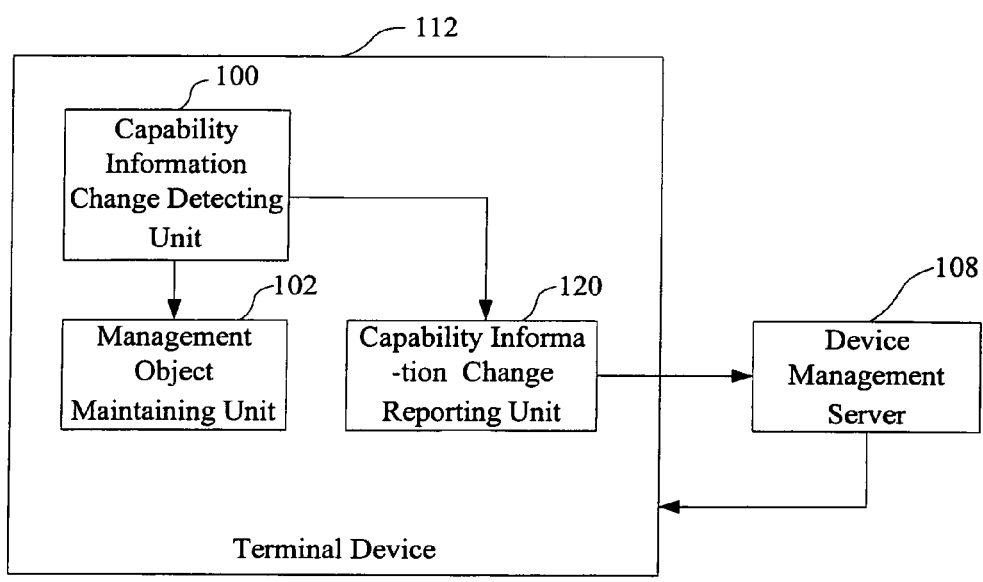
FIG. 16 is a structural block diagram illustrating a system for managing a Device Capability according to embodiments of the present invention.

Corresponding to the method for managing the Device Capability described above, a system for managing Device Capability is further provided according to the embodiments of the present invention. FIG. 16 is a structural block diagram illustrating a system for managing Device Capability according to the embodiments of the present invention. The system includes a terminal device 112 and a DMS 108, wherein:

the terminal device 112 includes a capability information change detecting unit 100, adapted to detect changed capability information in the terminal device, a management object maintaining unit 102, adapted to maintain a corresponding DCMO information in a DM tree based on the changed capability information detected by the capability information change detecting unit 100, and a capability information change reporting unit 120, adapted to report the changed capability information detected by the capability information change detecting unit 100 to the DMS 108; and the DMS 108 is adapted to manage and control the corresponding capability in the terminal device, via the maintained corresponding DCMO in the DM tree, according to the changed capability information reported by the capability information change reporting unit 120 in the terminal device 112.

Additionally, as for other relevant technical details of the method and the system for managing the Device Capability according to the embodiments of the present invention, please refer to respectively the relevant technical details of the method and the terminal device for maintaining the Device Capability Management Object described above. These will be omitted here.

It is apparent for those skilled in the art that various modifications and changes may be made to the present invention without departing from the spirit and the scope of the present invention. Therefore, the modifications and changes are intended to be covered within the present invention, provided that those modifications and changes of the present invention fall within the scope of the claims of the present invention and the equivalents thereof.

What is claimed is:

1. A method for maintaining a Device Capability Management Object which relates to a technical field of Open Mobile Alliance Device Management, comprising:
   detecting, by a terminal device, changed capability information in the terminal device by detecting capability information in the terminal device itself; and
   maintaining, by the terminal device, a corresponding Device Capability Management Object in a Device Management tree in the terminal device based on the detected changed capability information, wherein the maintaining is triggered by the terminal device itself, but is not triggered by any Device Management Server,
   wherein when the changed capability information comprises plugged-in of device capability in a corresponding interface, the maintaining the corresponding Device Capability Management Object by the terminal device comprises:
      according to the detected plugged-in of the device capability in the corresponding interface, setting a node designating Capability Status information of the corresponding Device Capability Management Object in the Device Management tree as a Connected status.

2. The method according to claim 1, wherein the detecting changed capability information in a terminal device by the terminal device comprises:
   scanning and refreshing capability information in the terminal device, upon receiving a command for triggering the terminal device to scan and refresh capability information in the terminal device.

3. The method according to claim 2, wherein the command received by the terminal device comprises:
   a command for trigging an executable node Refresh in the Device Management tree in the terminal device sent by a Device Management Server.

4. The method according to claim 2, wherein the command received by the terminal device comprises:
   a command for trigging an executable node Scan in the Device Management tree in the terminal device sent by the Device Management Server.

5. The method according to claim 1, wherein when the changed capability information comprises newly added capability information, the maintaining the corresponding Device Capability Management Object by the terminal device comprises:
   according to the detected newly added capability information, generating the corresponding Device Capability Management Object in the Device Management tree based on a pre-defined Device Description Framework of the Device Capability Management Object.

6. The method according to claim 1, wherein when the changed capability information comprises changed existing capability information, the maintaining the corresponding Device Capability Management Object by the terminal device comprises:
   according to the detected changed existing capability information, updating information on a node of the corresponding Device Capability Management Object in the Device Management tree.

7. The method according to claim 1, wherein when the changed capability information comprises removal of existing capability information, the maintaining the corresponding Device Capability Management Object by the terminal device comprises:
   according to the detected result of the removal of the existing capability information, removing the corresponding Device Capability Management Object in the Device Management tree.

8. The method according to claim 1, further comprising:
   maintaining, by the terminal device, a corresponding default Device Capability Management Object in the Device Management tree beforehand for each device capability connection interface in the terminal device.

9. The method according to claim 8, wherein when the changed capability information comprises device capability information newly connected to a corresponding interface, the maintaining the corresponding Device Capability Management Object by the terminal device comprises:
   according to the detected device capability information newly connected to the corresponding interface, updating information on respective node of the corresponding default Device Capability Management Object in the Device Management tree.

10. The method according to claim 8, wherein when the changed capability information comprises removal of device capability information connected to a corresponding interface, the maintaining the corresponding Device Capability Management Object by the terminal device comprises:
    according to the detected result of the removal of the device capability information connected to the corresponding interface, restoring information on respective node of the corresponding Device Capability Management Object in the Device Management tree to information on the corresponding respective node of the default Device Capability Management Object.

11. The method according to claim 1, wherein when the changed capability information comprises removal of device capability in a corresponding interface, the maintaining the corresponding Device Capability Management Object by the terminal device comprises:

according to the detected removal of the device capability in the corresponding interface, setting a node designating Capability Status information of the corresponding Device Capability Management Object in the Device Management tree as a Unconnected status.

12. The method according to claim 1, wherein when the changed capability information comprises device capability information newly connected to a corresponding interface, the maintaining the corresponding Device Capability Management Object by the terminal device comprises:

according to the detected device capability information newly connected to the corresponding interface, setting Access Type of each node of the corresponding Device Capability Management Object in the Device Management tree as allowed for the management of the Device Management Server.

13. The method according to claim 1, wherein when the changed capability information comprises removal of device capability information connected to a corresponding interface, the maintaining the corresponding Device Capability Management Object by the terminal device comprises:

according to the detected result of the removal of the device capability information connected to the corresponding interface, setting Access Type of each node of the corresponding Device Capability Management Object in the Device Management tree as disallowed for the management of the Device Management Server.

14. A terminal device which relates to a technical field of Open Mobile Alliance Device Management, comprising:

a capability information change detecting unit, adapted to detect changed capability information in the terminal device by detecting capability information of the terminal device itself; and a management object maintaining unit, adapted to maintain a corresponding Device Capability Management Object in a Device Management tree based on the changed capability information detected by the capability information change detecting unit, wherein the maintaining is triggered by the terminal device itself, but is not triggered by any Device Management Server, wherein when the changed capability information comprises plugged-in of device capability in a corresponding interface, the management object maintaining unit is adapted to, according to the detected plugged-in of the device capability in the corresponding interface, set a node designating Capability Status information of the corresponding Device Capability Management Object in the Device Management tree as a Connected status.

15. The terminal device according to claim 14, wherein the capability information change detecting unit comprises:

a command receiving sub-unit, adapted to receive a command for triggering the terminal device to scan and update capability information in the terminal device; and an information detecting sub-unit, adapted to detect the changed capability information through scanning and updating capability information in the terminal device, upon receiving a command by the command receiving sub-unit.

16. The terminal device according to claim 14, wherein the changed capability information detected by the capability information change detecting unit comprises newly added capability information; and the management object maintaining unit generates a corresponding Device Capability Management Object in the Device Management tree, based on a pre-defined Device Description Framework of the Device Capability Management Object, according to the newly added capability information detected by the capability information change detecting unit.

17. The terminal device according to claim 14, wherein the changed capability information detected by the capability information change detecting unit comprises changed existing capability information; and according to the changed existing capability information detected by the capability information change detecting unit, the management object maintaining unit updates information on a node of the corresponding Device Capability Management Object in the Device Management tree.

18. The terminal device according to claim 14, wherein the changed capability information detected by the capability information change detecting unit comprises removal of existing capability information; and according to the result of the removal of the existing capability information detected by the capability information change detecting unit, the management object maintaining unit deletes the corresponding Device Capability Management Object in the Device Management tree.

19. The terminal device according to claim 14, further comprising a capability information change reporting unit adapted to report the changed capability information detected by the capability information change detecting unit to a Device Management Server.

20. A method for managing Device Capability which relates to a technical field of Open Mobile Alliance Device Management, comprising:

detecting, by a terminal device, changed capability information in the terminal device by detecting capability information in the terminal device itself;

maintaining, by the terminal device, a corresponding Device Capability Management Object in a Device Management tree based on the detected changed capability information, wherein the maintaining is triggered by the terminal device itself, but is not triggered by any Device Management Server;

reporting, by the terminal device, the detected changed capability information to a Device Management Server; and managing, by the Device Management Server, corresponding capability in the terminal device via the maintained corresponding Device Capability Management Object in the Device Management tree, based on the changed capability information reported by the terminal device, wherein when the changed capability information comprises plugged-in of device capability in a corresponding interface, the maintaining the corresponding Device Capability Management Object by the terminal device comprises:

according to the detected plugged-in of the device capability in the corresponding interface, setting a node designating Capability Status information of the corresponding Device Capability Management Object in the Device Management tree as a Connected status.

21. The method according to claim 20, wherein managing the changed capability by the Device Management Server comprises updating, by the Device Management Server, capability information of the terminal device through invoking node Refresh of the Device Capability Management Object.

22. The method according to claim 20, wherein managing the changed capability by the Device Management Server comprises upgrading, by the Device Management Server, drive data of corresponding capability of the terminal device through invoking node Update of the Device Capability Management Object.

23. The method according to claim 20, wherein managing the changed capability by the Device Management Server comprises removing, by the Device Management Server, drive data of corresponding capability of the terminal device through invoking node Remove of the Device Capability Management Object.

24. A system for managing Device Capability which relates to a technical field of Open Mobile Alliance Device Management, comprising:
- a terminal device; and
- a Device Management Server,
- wherein the terminal device comprises:
  - a capability information change detecting unit, adapted to detect changed capability information in the terminal device by detecting capability information of the terminal device itself;
  - a management object maintaining unit, adapted to maintain a corresponding Device Capability Management Object in a Device Management tree based on the changed capability information detected by the capability information change detecting unit, wherein the maintaining is triggered by the terminal device itself, but is not triggered by any Device Management Server; and
  - a capability information change reporting unit, adapted to report the changed capability information detected by the capability information change detecting unit to the Device Management Server; and
- the Device Management Server is adapted to manage corresponding capability in the terminal device via the maintained corresponding Device Capability Management Object in the Device Management tree, based on the changed capability information reported by the capability information change reporting unit in the terminal device,
- wherein when the changed capability information comprises plugged-in of device capability in a corresponding interface, the management object maintaining unit is adapted to, according to the detected plugged-in of the device capability in the corresponding interface, set a node designating Capability Status information of the corresponding Device Capability Management Object in the Device Management tree as a Connected status.

* * * * *